UNITED STATES PATENT OFFICE.

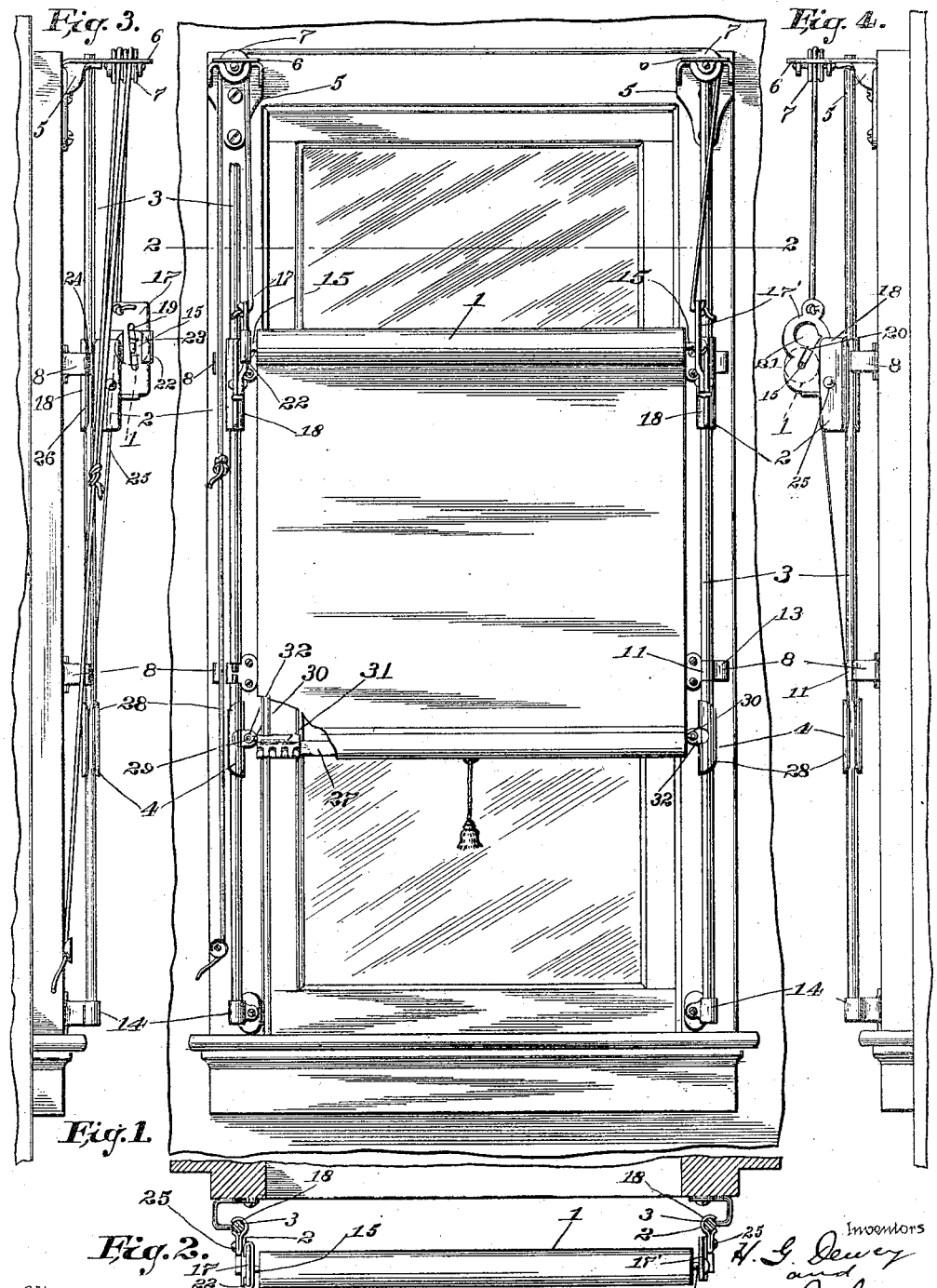

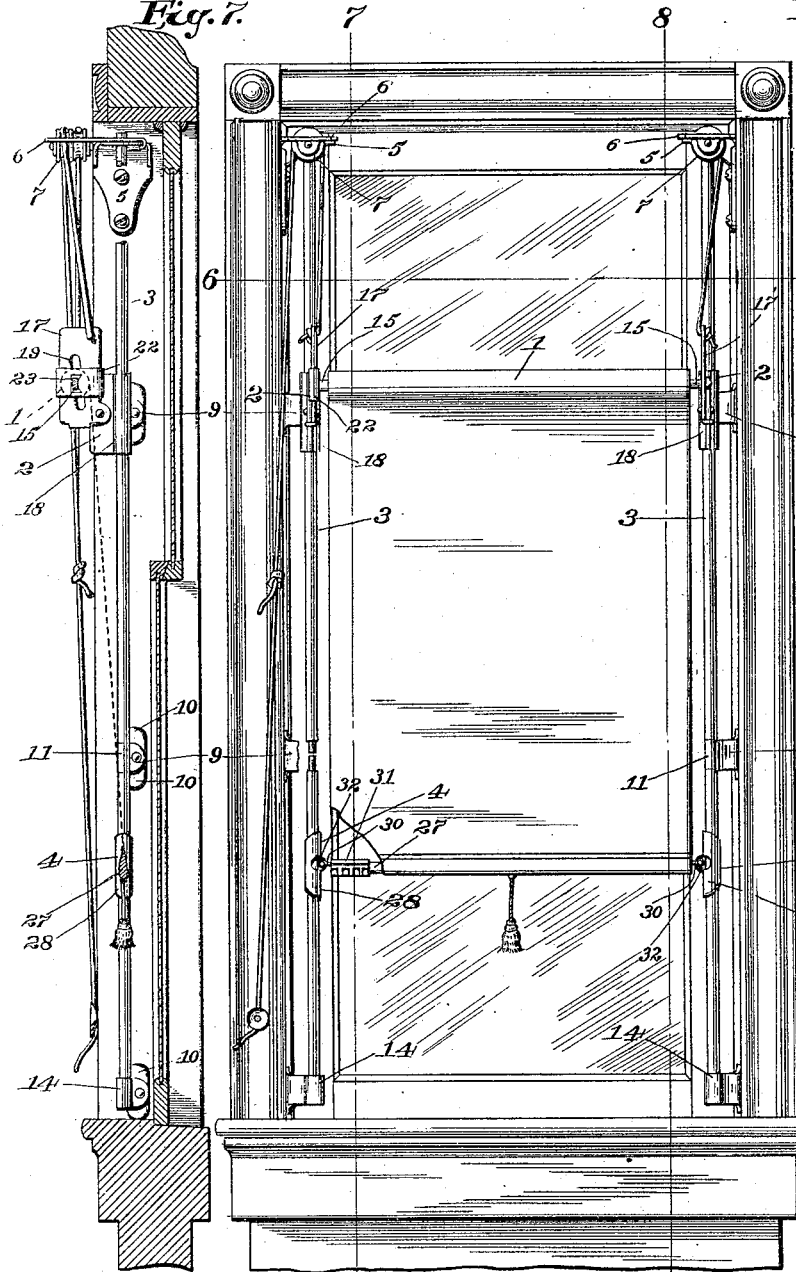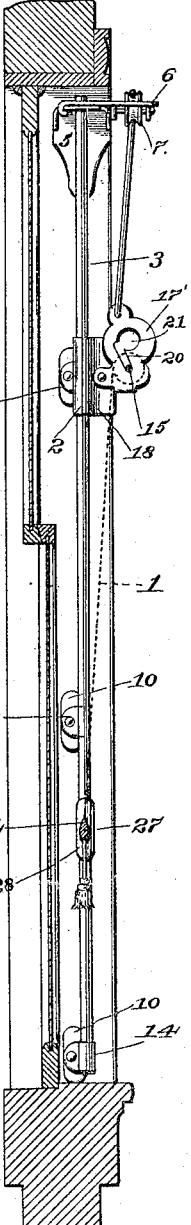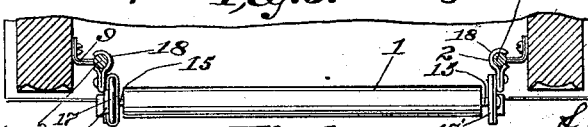

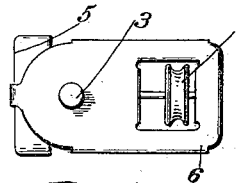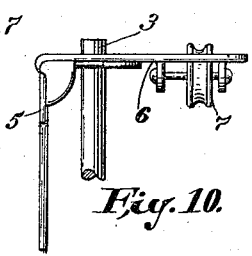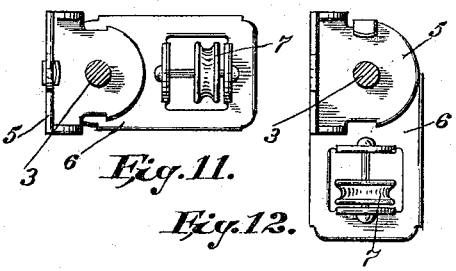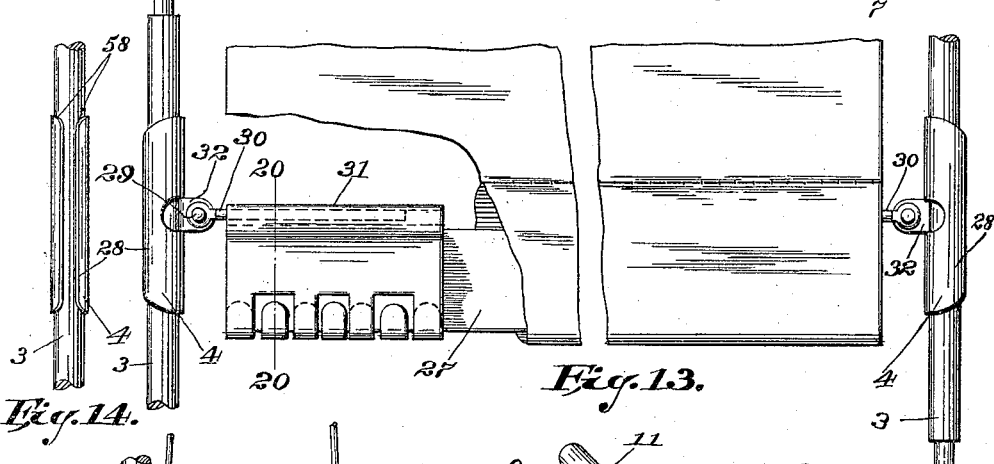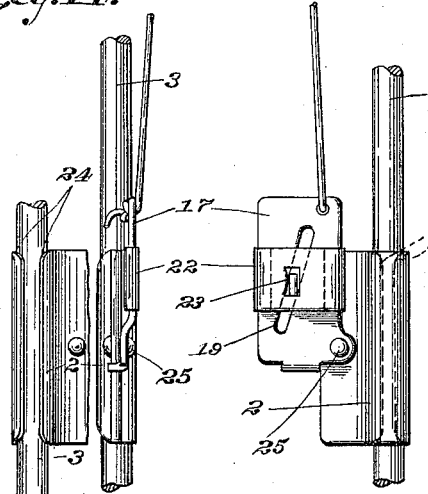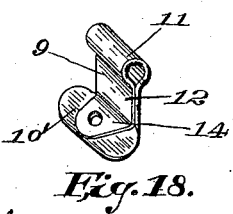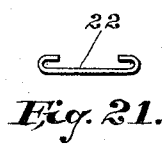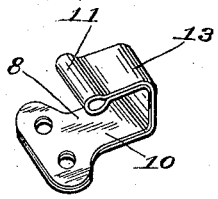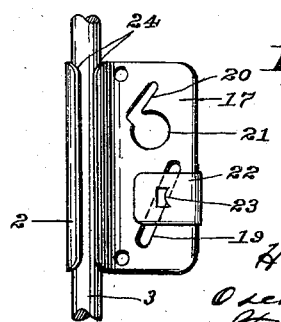

HAYWOOD GUION DEWEY, OF WESTMINSTER, AND OSCAR D. GREEN, OF BALTIMORE, MARYLAND.

SHADE-CARRIER.

1,203,593.

Specification of Letters Patent.

Patented Nov. 7, 1916.

Application filed August 3, 1914. Serial No. 854,844.

*To all whom it may concern:*

Be it known that we, HAYWOOD GUION DEWEY and OSCAR D. GREEN, citizens of the United States of America, the former residing at Westminster, Carroll county, and the latter residing in the city of Baltimore, both in the State of Maryland, have invented certain new and useful Improvements in Shade-Carriers, of which the following is a specification.

This invention relates to a new and improved window shade carrier and stick guide of the type in which the curtain roll is made to travel up and down the window so that the curtain or shade may be adjusted to give any desired opening at the top or bottom.

Window shade carriers of this general type having vertical guide rods and two sets of carriages, one set carrying the roll and the other or bottom set serving as a stick guide, have been in use.

The present invention relates to various improvements in and refinements of this structure.

In installations of this device it is often necessary to provide for an exceedingly long traverse of the roll where the windows are of a considerable height. For this purpose very long guide rods are necessary and to give the requisite stiffness to prevent flapping and rattling during high winds, the rods have to be made of considerable weight and thickness. This not only adds to the expense, but renders the structure cumbersome and unsightly. To overcome this difficulty, we support the rods at numerous intermediate points, preferably using short rods shouldered at the ends to fit into ferrules of an outside diameter equal to that of the rods, the ferrules being made integral each with a supporting bracket secured to the window frame, and in order that the supports may not interfere with the sliding carriages, we use as a follower on each carriage, instead of the former continuous sleeve, a sleeve which is slotted to provide for the passage of the bracket arm. However, it is found that if the follower sleeve supporting the roller fixture proper is slotted vertically at a point exactly opposite the point of suspension of the sleeve on the fixture, the edges of the sleeve at the slot which is necessarily widened or opened at the top and bottom to find the bracket arm, have a tendency to grip the rods, particularly when they become rusty, and interfere with the operation of the device. To prevent this action, we change the position of the slot so that instead of being opposite the point of suspension of the roller fixture, it is separated therefrom by an arc of 90 degrees, and the tendency of the sleeve to swing in a vertical plane toward the roller, and the consequent tendency of the slot to grip the opposite side of the rod is overcome, for the turning moment is opposed by the solid side of the tube or follower instead of by the slotted portion.

Incident to the universal application of the carrier is the necessity for placing it on the front as well as on the inside of the window casing, the top and bottom brackets being made adjustable or interchangeable for this purpose, and while in most devices of this kind it is necessary to make two forms, one for use in one position and the other in the other, and this would seem to be particularly necessary in the case of the slotted follower sleeve, we have so far overcome this difficulty that it is possible to install our device either on the front or on the inside of the window casing with but a single change. The bracket, which may be termed an intermediate support receiving the abutting ends of the sections of guide rod, is made in two forms, that which is used on the inside of the casing being merely a straight armed bracket with an eye at the end, while that which is used on the face of the casing, it being important to retain the slot in the follower substantially 90 degrees from the point of engagement of the follower with the fixture, has an L-shaped arm, the bracket arm at the ferrule end bearing the same relation to the follower sleeve that it does when the fixtures are placed inside the casing.

In the accompanying drawing we have illustrated a window shade carrier, the same being in accordance with our invention in the preferred forms.

Figure 1 is a front elevation of a window with the shade and improved carrier applied thereto, the guides being placed on the face of the window casing; Fig. 2 is a horizontal section on the line 2, 2 of Fig. 1; Fig. 3 is a side elevation looking at the structure from the left-hand side of Fig. 1; Fig. 4 is a side elevation of the same structure from the opposite side; Fig. 5 is a front elevation of a window with the guides mounted on the inner faces of the casing; Fig. 6 is a horizontal section on the line 6, 6 of Fig. 5; Fig. 7 is a vertical section on the line 7, 7 of Fig. 5; Fig. 8 is a similar section on the line 8, 8 of Fig. 5, looking to the right while Fig. 7 is looking to the left; Fig. 9 is a top plan of the guide bracket; Fig. 10 is a side elevation of the same; Fig. 11 is a bottom plan; Fig. 12 is a similar plan of the same bracket with the arm rotated to adapt the bracket for use on an inner face of the casing, while the bracket in the position shown in the previous figures is intended for use on the front face of the casing; Fig. 13 shows the stick guide and followers on an enlarged scale; Fig. 14 shows the guide follower for the stick, the same being on the guide rod and viewed from the left of the device as shown in Fig. 13; Fig. 15 illustrates a roller carriage; Figs. 16 and 17 are elevations of the carriage taken from different sides from Fig. 15; Fig. 18 is a perspective view of one of the guide brackets for use on the front face of a window frame; Fig. 19 is a detail of a bracket for use on the front of a window casing; Fig. 20 is a section on the line 20 in Fig. 13; Fig. 21 is a plan of the clip; and Fig. 22 shows a slide bracket of a reversible type having a slot for the flat pivot at one end and a slot to engage the rotary pivot at the other end, the fixture being used with either end up at the corresponding side of the window and to coöperate with the corresponding pivot of the shade roll.

Referring to the drawing by numerals, each of which is used to indicate the same or similar parts in the different figures, the device consists of a shade roll 1, suitably mounted on slides or carriages 2 which move up and down the window on guide rods 3, the lower end of the shade being preferably held against flapping and guided by means of the stick carriers 4 likewise mounted to slide on the guide rods 3. The upper ends of the guide rods 3 are preferably engaged and held by means of top guide brackets 5 having an adjustable swinging arm 6 carrying one or two pulleys 7 with a cord whereby the roller is moved up and down. The adjustable bracket arm is adapted to take up a position as illustrated in Figs. 1, 9, 10 and 11, or a position at right angles to this one so that it may be used either on the front face or the inner face of the window casing. In the present instance, the guides 3, or more properly, guide rods, extend from the bottom to the top of the window at each side, the lower ends of the rods being supported in brackets 14 which inclose the rods and form stops for the sliding members, and in order that the rods need not be made of excessive weight and diameter to give the requisite stiffness, they are supported at short intervals throughout their length by means of intermediate brackets 8 for use on the front face, see Fig. 19, and 9, for use on the inner face, see Fig. 18. These brackets consist each of a wall plate 10, 10' a vertically disposed ferrule 11 and a flat web or arm 12 by means of which the ferrule is supported from the wall plate. In order to maintain the relations of the parts as hereinafter described, the bracket 8, instead of having a straight web as has the bracket 9, has an L-shaped web or arm 13, the entire bracket in each instance as will be clear from observation of the drawing, being stamped from a single piece of sheet metal and bent to the desired form by a simple operation.

It has been pointed out that the brackets 8 and 9 serve to support the guide rods at short intervals. The ferrules are preferably of an outside diameter equal to the diameter of the guide rod and the guide rods are reduced to receive the ferrules so that the outer surface of the ferrules are flush with the outer surfaces of the rods, and for convenience in handling, each guide is made in several sections, the ends of the sections being reduced and shouldered to fit inside the ferrules which serve as joints or joining members to join the rod sections to form a continuous guide. This gives not only ease in handling but convenience in packing and setting up, the short sections being much more easily handled and easily kept straight than are the continuous rods of the length required.

The roll pivots 15 of the usual type, one flat and the other circular, are mounted in ears 17 and 17' secured to the followers or slides 18 which travel up and down the guide rods 3. The connection between the ears 17 and 17' and the followers 18, comprising the roll carriers 2, is preferably a pivotal connection, but the ears may be otherwise mounted on the slides within the scope of the invention.

The ears 17 and 17' are provided, one with an inclined slot 19 to receive the flat pivot of the roll, and the other with slot 20 in any suitable form, the slot being rounded at the base to provide a bearing for the circular pivot, the upper end of the slot opening into a circular aperture 21 to give added facility in entering. To hold the flat pivot in the inclined slot 19, a sliding clip 22 having its ends bent over the edges of the ear is provided. This clip is apertured at 23 to admit the pivot, the aperture being of slightly greater width than the slot and in registration with the slot when opposite its upper end. The pivot is passed through the aperture in the clip and the slot in the ear when the weight of the roll carries the pivot and clip downward. As they move downward the opening 23 tends to pass out of registration with the slot and a clamping action takes place which prevents withdrawal of the pivot. To insert the roll pivots in the ear slots, the slides with the ears thereon are first swung outward to admit the roll between them and then returned to normal, i. e., parallel position, as shown in Figs. 1 and 2, the pivots having a clamping action by which the parts are held in their operative relation.

An important feature of the invention is found in the coöperative relation of the followers to the guides and intermediate supporting brackets. It will be apparent that the followers must be designed to pass the bracket arms. For this purpose they are slotted vertically and as the relations of the followers to the roll and so forth, are slightly flexible, it is necessary in order that the slides or followers may pass the bracket arms without obstruction, that the ends of these slots should be widened or opened as illustrated at 24 in Fig. 16 and also in Fig. 3. It has been found however, that if the slot is placed directly opposite the point of suspension of the rolls, which is in this instance, the pivot 25 carrying the ears 17 and 17', the tendency to rotate in a vertical plane which is imparted to the followers by the roll results in a clamping action or gripping of the rods by the followers, particularly at the widened entrances 24 to the slot so that the operation of the device, especially when the rods are rusty, is impeded to a considerable extent, but by experiment it has been found that if the slots are placed on the side, i. e., in a position removed by an arc of ninety degrees from the point of suspension 25, this action does not take place and the followers slide freely over the guides under all conditions even though the parts be heavily corroded.

With the structure shown in Figs. 5 and 6, the intermediate bracket illustrated in Fig. 18, is used and this coöperates to the best advantage with the follower slotted on the side as described, but with the arrangement shown in Fig. 1, where the brackets are mounted on the front face of the window casing, this bracket 9 cannot be so conveniently used as with it the slot in the follower 26 must be placed directly opposite the point of suspension 25 of the roll 1. To avoid this, the bracket 8, having an L-shaped arm 13 supporting the ferrule 11 has been provided. This is the only element of the whole structure which is not used in the preferred form of the invention to set up the device both on the front or the inner face of the casing. In this way the bracket arm and slot are disposed at an angle of ninety degrees to or separated by an arc of ninety degrees from the point of suspension of the ear carrying the roll.

The lower end of the shade is provided with the usual stiffening bar or stick 27, carried and held against flapping and displacement by means of stick guides 4 in the form of slotted tubes or sleeves 28 one at each end, mounted to slide and travel up and down the guide rods 3. The slots in these tubes are formed in the same manner as in the followers 18, the ends being enlarged at 58 to find the bracket arms, but in this instance, the slots are opposite the points of suspension 29 of the stick, the weight supported, if any, being insufficient to cause gripping or seizing of the guide rods by the follower. The suspension 29 referred to consists of a sliding and pivotal connection with the stick, that is, a pin 30 is pivotally connected to the follower and mounted to slide in a bearing 31 on the stick, the pivotal connection being made with an ear 32 cut out of the sheet metal forming the follower and turned up to receive the pivot pin.

One interesting and important feature of the whole invention is found in the fact that each and all of the brackets, followers and supports is so devised that it may be constructed in a convenient and economical manner out of sheet metal, each integral part being formed of a single piece of sheet metal, which is easily stamped and bent to the desired shape. This is true of all the parts with the exception of the rods, all the other parts including the top brackets 5 and 6, the stick guides 4, the intermediate brackets 8, the ears 17 and 17', as well as the stick ferrules 31, each being made from sheet metal and so designed that they are formed economically from a single piece which is conveniently stamped and bent to shape.

The other advantages as the absence of long members to pack and set up, the interchangeability of the parts and the lightness and rigidity of the structure have been fully brought out.

We have thus described the preferred forms of our invention specifically and in detail in order that their nature and operation may be clearly understood. However, the specific terms herein are used in their descriptive rather than in their limiting sense and the scope of the invention is defined in the claims.

We claim:

1. In a window shade carrier, vertical guide rods, each rod being formed in a plurality of pieces, the adjacent ends of the several pieces being reduced, means for supporting the upper and lower ends of the rods and intermediate brackets, each bracket having a ferrule of outside diameter equal to the diameter of the rod, the opening in the ferrule being adapted to receive the adjacent ends of the several pieces forming the guides.

2. In a window shade carrier, vertical guide rods, each rod being formed in a plurality of pieces, the adjacent ends of the several pieces being reduced, means for supporting the upper and lower ends of the rods, intermediate brackets, each bracket having a ferrule of outside diameter equal to the diameter of the rod, the opening in the ferrule being adapted to receive the adjacent ends of the several pieces forming the guides, and followers mounted on the rod and provided with ears to receive the pivots of the curtain roll, the followers being in the form of longitudinally slotted tubes, the slots being separated from the points of suspension by an arc of substantially ninety degrees.

3. In a window shade carrier, vertical guide rods, each rod being formed in a plurality of pieces, the adjacent ends of the several pieces being reduced, means for supporting the upper and lower ends of the rods, intermediate brackets, each bracket having a ferrule of outside diameter equal to the diameter of the rod, the opening in the ferrule being adapted to receive the adjacent ends of the several pieces forming the guides, and followers mounted on the rod and provided with ears to receive the pivots of the curtain roll, the followers being in the form of longitudinally slotted tubes, the slots being separated from the points of suspension by an arc of substantially ninety degrees, the intermediate brackets having an L-shaped web supporting the ferrules.

4. In a window shade carrier, vertical guide rods, each rod being formed in a plurality of pieces, the adjacent ends of the several pieces being reduced, means for supporting the upper and lower ends of the rods, intermediate brackets, each bracket having a ferrule of outside diameter equal to the diameter of the rod, the opening in the ferrule being adapted to receive the adjacent ends of the several pieces forming the guides, and followers mounted on the rod and provided with ears to receive the pivots of the curtain roll, the followers being in the form of longitudinally slotted tubes, the slots being separated from the points of suspension by an arc of substantially ninety degrees, the brackets and followers being made of sheet metal.

5. In a window shade carrier in combination vertical guide rods, intermediate supporting members for the rods in the form of an L-shaped bracket, followers mounted on the rods and provided with means for supporting a curtain roll, the followers being in the form of longitudinally slotted tubes and means for supporting the vertical rods at their ends.

6. In a window shade carrier in combination vertical guide rods, intermediate supporting members for the rods in the form of an L-shaped bracket, followers mounted on the rods and provided with means for supporting a curtain roll, the followers being in the form of longitudinally slotted tubes, the slots being separated from the points of suspension of the curtain rolls by an arc of substantially ninety degrees and means for supporting the vertical rods at their ends.

7. In a window shade carrier, vertical guide rods, intermediate supporting members for the rods, followers mounted on the rods and provided with means for supporting a curtain roll, the followers being in the form of longitudinally slotted tubes, the intermediate supporting members being in the form of brackets having L-shaped arms, the guide rods being secured to the front faces of the window casing.

Signed by us at Baltimore, Maryland, this 28th day of July, 1914.

HAYWOOD GUION DEWEY.
OSCAR D. GREEN.

Witnesses:
ZELLA KUHN,
EDWIN F. SAMUELS.

Copies of this patent may be obtained for five cents each, by addressing the "Commissioner of Patents, Washington, D C."